United States Patent [19]

Nadherny

[11] Patent Number: 5,152,652
[45] Date of Patent: Oct. 6, 1992

[54] COTTER PIN SPREADER WITH SAFETY LOCK FEATURE

[75] Inventor: Rudolph E. Nadherny, Naperville, Ill.
[73] Assignee: Ireco, Inc., Chicago, Ill.
[21] Appl. No.: 788,484
[22] Filed: Nov. 6, 1991
[51] Int. Cl.⁵ .............................................. F16B 21/14
[52] U.S. Cl. .................................... 411/513; 411/364
[58] Field of Search ............... 411/513, 515, 530, 363, 411/364

[56] References Cited

U.S. PATENT DOCUMENTS

| 750,501 | 1/1904 | Tarbox | 411/513 X |
|---|---|---|---|
| 1,751,013 | 3/1930 | McMullen | 411/364 |
| 1,918,148 | 7/1933 | Strickland | 411/364 X |
| 2,122,073 | 6/1938 | Schaefer | 411/364 X |
| 2,345,141 | 3/1944 | McMullen | 411/513 |
| 2,391,140 | 12/1945 | Dilley | 411/513 |
| 2,559,737 | 7/1951 | Schaefer | 411/513 |

Primary Examiner—Richard E. Moore
Assistant Examiner—Suzanne L. Dino
Attorney, Agent, or Firm—Lockwood, Alex, FitzGibbon & Cummings

[57] ABSTRACT

A device for automatically spreading and locking cotter pins as they are driven into place. The device is an improvement on the cotter pin spreading devices disclosed in U.S. Pat. Nos. 1,751,013 dated Mar. 18, 1930 and 2,345,141 dated Mar. 28, 1944. The improved devices have locking extensions which, during the act of driving cotter pins into place, become deformed into locking engagement with the heads on the driven and spread cotter pins. Several forms of locking extensions are disclosed.

17 Claims, 4 Drawing Sheets

COTTER PIN SPREADER WITH SAFETY LOCK FEATURE

BACKGROUND AND DESCRIPTION OF THE INVENTION

This invention relates to innovations and improvements in known devices for spreading cotter pins when they are driven in place in various applications, particularly those connected with the railroad industry. The improvements comprise incorporating safety lock features on the prior or known cotter pin spreading devices whereby when the cotter pins are driven in place, the driven cotter pins become locked in place. The locking features of the present invention may be either automatically implemented and transformed into their locking condition during the act of driving cotter pins in place or may be of the type which requires a separate bending step to bring about the locking relationship with a cotter pin that has already been installed or driven in place.

The cotter pin spreader devices with locking features of the present invention not only serve to lock cotter pins in place after they have been driven or installed, but also serve to facilitate the proper installation or insertion of cotter pins and prevent improper insertion or installation.

The object of the invention, generally stated, is the provision of new and improved cotter pin spreader devices with locking means for locking cotter pins securely in their driven or installed condition.

An important object of the invention is the provision of new and improved cotter pin spreader devices that incorporate locking means which are automatically transformed into their cotter pin locking condition during the act of driving the cotter pins into place.

Certain other objects of the invention will be apparent to those skilled in the art upon obtaining a complete understanding of the nature and scope of the invention on reference to the following detailed description of preferred embodiments of the invention taken in connection with the accompanying drawings wherein.

Figure 1:
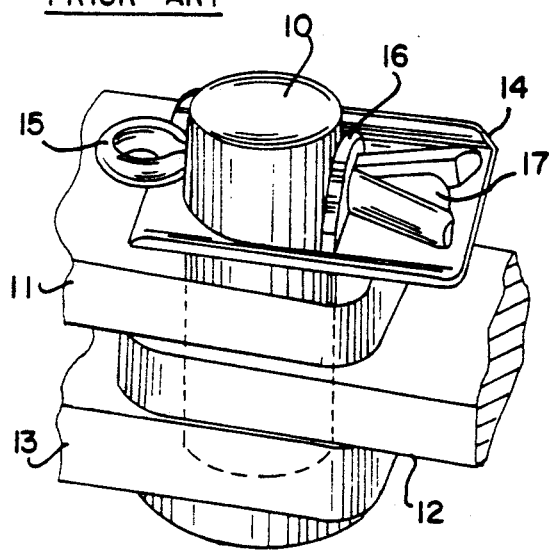
FIG. 1 is a fragmentary perspective view showing a cotter pin spreader device of the prior art in its installed condition.

Referring to FIG. 1, a pin indicated generally at 10 is shown interconnecting three members 11, 12 and 13. Over the upper protruding end of the pin 10 a cotter pin spreader device 14 is placed and a cotter pin 15 is shown in its driven and spread condition securing the assembly together. The spreader 14 is of known type and corresponds generally to the spreader shown and described in the above-mentioned U.S. Pat. No. 1,751,013.

As will be seen from FIG. 1, the spreader device 14 is in the form of a generally flat, rectangular plate with the longer edges upturned to provide additional strength and places to grasp. A hole or opening is provided in the plate 14 large enough to accommodate the pin 10 with at least a portion of the material removed in forming the opening being upturned at 90° to provide a flange 16 which is apertured to receive the shank of the cotter pin 15. The plate 14 also has an integrally formed, wedge shaped spreader formation 17 which may be formed therein by pressing this formation from the plate stock.

In use, after the pin 10 has been inserted through the openings in the members 11–13, the spreader device 14 is placed over the protruding upper end of the bolt or pin 10 with the spreader formation 17 and the aperture in the flange 16 being aligned with the usual transverse bore in the pin 10 for accommodating the shank of the cotter pin 15. The cotter pin 15 is then inserted through the bore so that the end of its shank engages the inner pointed portion of the wedge spreader formation 17. Thereupon, the cotter pin 15 is driven from the head end so that the split shank of the cotter pin is spread apart or bifurcated at its distal end into the spread condition illustrated in FIG. 1.

While cotter pin spreaders such as 14 have been used for a number of years, particularly in the railroad industry, they have suffered the disadvantage that they fail to prevent the cotter pins associated therewith from becoming accidentally loosened and removed or lost under certain conditions. For example, a force or blow exerted on the spread ends of the cotter pin 15 may cause the cotter pin to be driven outwardly with the spread ends being forced together so as to allow it to pass through the aperture in the flange 16.

Figure 2:
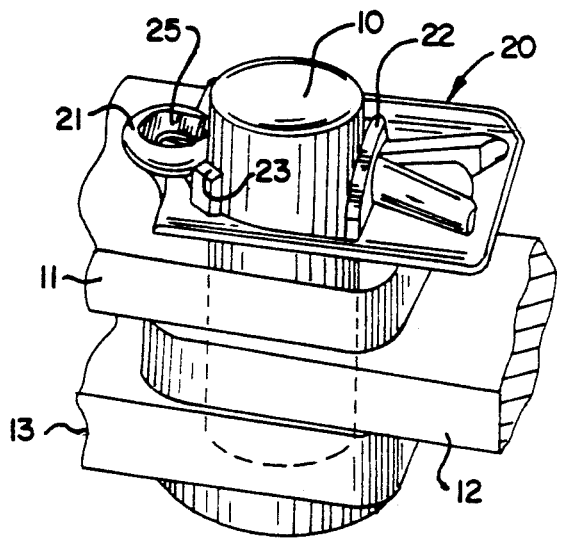
FIG. 2 is a perspective view showing in its installed condition a cotter pin spreader device incorporating a locking feature or locking means and forming one embodiment of the present invention.
Figure 4:
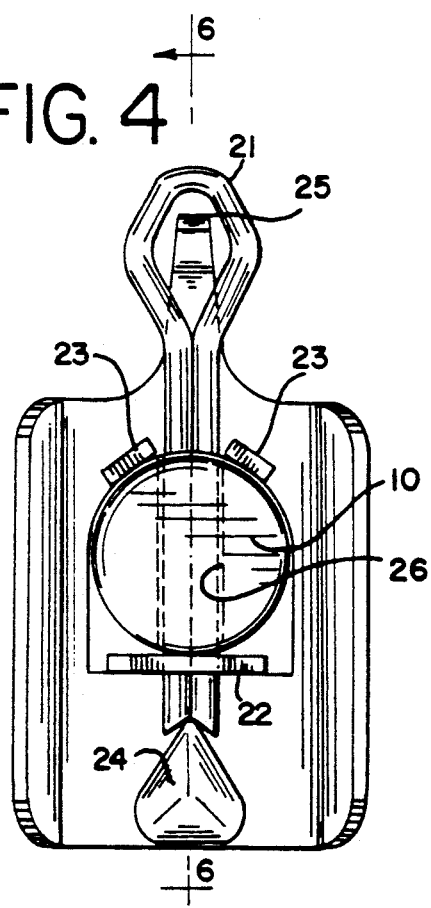
FIG. 4 is a top plan view corresponding to FIG. 3 but showing the condition of the cotter pin spreader and locking device after a cotter pin has been inserted but before it has been driven so as to become spread and locked in place as shown in FIGS. 2 and 3.

The combination cotter pin spreader and locking devices of the present invention can be relied on to overcome the disadvantages of the prior art cotter pin spreader devices as represented by the spreader 14 of FIG. 1 or the spreaders shown in the above-mentioned U.S. Pat. No. 2,345,141 so as to eliminate, or at least substantially reduce, the chances of a properly driven or installed cotter pin from becoming accidentally dislodged or loosened. One such embodiment of the invention is shown and illustrated in FIGS. 2-7 to which reference is now made. Referring to FIG. 2, the pin or bolt 10 is 10 shown interconnecting the members 11-13 as in FIG. 1. A combination cotter pin spreader and locking device indicated generally at 20 is shown in place over the protruding end of the pin 10 with a cotter pin 21 shown in its fully driven, spread and locked condition.

The cotter pin spreader and locking device 20 has the usual opening to accommodate the pin or bolt 10. Portions of the material removed in forming the opening have been bent up to provide an apertured flange 22 and a pair of upstanding tabs 23—23 on the side of the pin-receiving opening opposite to the flange 22. The space between the tabs 23 is wide enough to receive the shank of cotter pin 21 and automatically align the eye or head of the cotter pin with the locking tab 25. The aperture in the flange 22 is aligned with the point of a wedge shaped spreader formation 24 integrally formed by upsetting a generally tear-drop shaped portion of the plate material.

The spreader and locking device 20 has integrally formed thereon on its outer edge or margin which is on the side of the pin receiving opening opposite the flange 22 and spreader formation 24, a locking tab or extension 25. Preferably the device 20 is formed from a malleable material such as steel or other metal so that the tab or extension 25 can be readily deformed when the cotter pin 21 is driven into place.

In use, the unspread shank of the cotter pin 21 is inserted in the transverse bore 26 in the pin 10 with the aperture in the flange 22 being aligned with the bore 26. The cotter pin 21 is shown partially inserted in FIG. 6 and completely inserted in FIG. 4 still in its unspread condition. By driving on the head end of the cotter pin 21, it will become further inserted as the distal end of the cotter pin shank engages the spreader 24 and the shank of the cotter pin becomes spread apart as shown in FIGS. 2 and 3.

Figure 3:
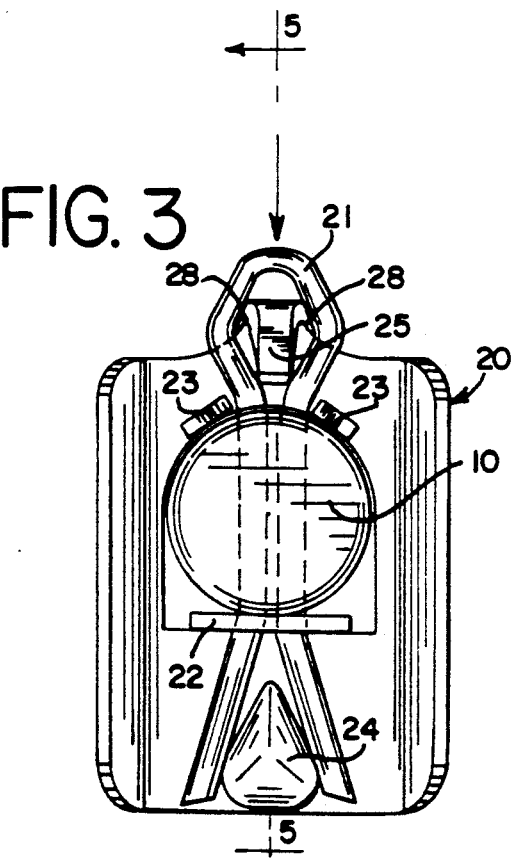
FIG. 3 is a top plan view of the cotter pin spreader and locking device as shown in FIG. 2.
Figure 5:
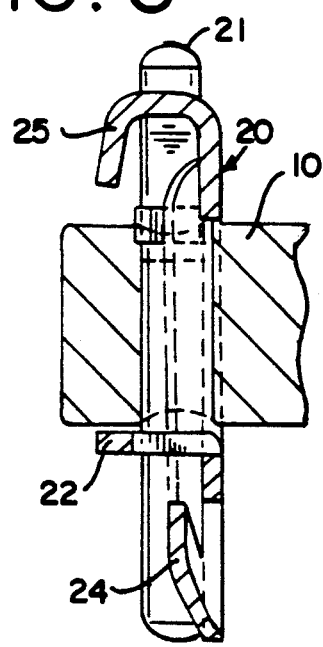
FIG. 5 is a sectional view taken on line 5—5 of FIG. 3 with the cotter pin being shown in elevation.

As the cotter pin 21 is progressively driven into place, the eye in the head of the cotter pin catches the distal end of the tab 25 and causes it to curl over into its cotter pin locking condition shown in FIGS. 2, 3 and 5. The tab or extension 25 is sufficiently malleable or deformable so that it does not interfere with the normal driving or setting of the cotter pin 21 into its fully spread and locked condition shown in FIGS. 2, 3 and 5.

Figure 6:
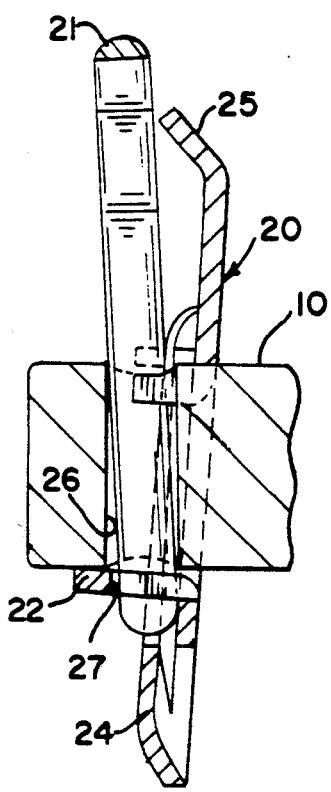
FIG. 6 is a sectional view taken on line 6—6 of FIG. 4 but showing the cotter pin partially inserted into place.
Figure 7:
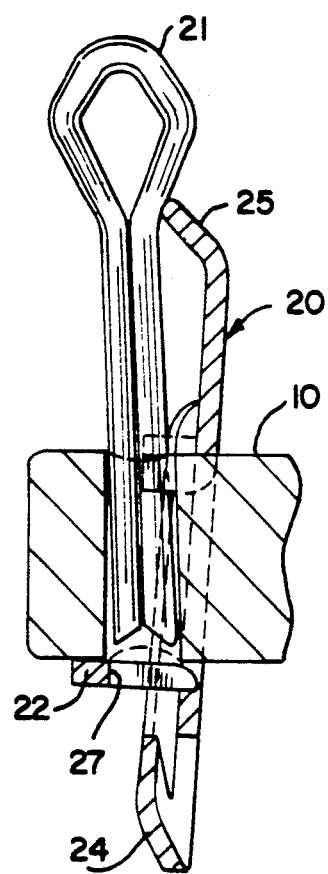
FIG. 7 is a sectional view similar to FIG. 6 but showing the cotter pin rotated 90° from its orientation in FIG. 6 into an incorrect position in which it cannot be inserted into place.

FIG. 7 illustrates that if a cotter pin 21 is inserted improperly so that its head is turned at 90° to the correct position shown in FIGS. 2 and 6, the engagement between the side of the cotter pin head and the tip of the tab 25 will prevent the cotter pin 21 from being fully inserted through the bore 26 in the pin 10 and the aperture 27 in the flange 22.

In the fully driven and locked condition of the cotter pin 21 as illustrated in FIGS. 2, 3 and 5, the tab or extension 25 in its deformed or curled condition prevents the cotter pin 21 from being removed or displaced axially. The tab 25 is so tapered that in its curled locking condition its opposing edges engage and lock against the inside of the eye in the head of the cotter pin 21 as indicated at 28—28 (FIG. 3). The tab 25 prevents rotation of the cotter pin 21 and if for some unforeseen reason the legs of cotter pin 21 are not spread properly on insertion of the pin, the tab 25 will also serve as a secondary lock and retain the pin in place and prevent its accidental removal. If it is desired to remove the cotter pin 21 from the pin 10, the extension or tab 25 must first be forcibly bent and restored to approximately its original uncurled condition.

A second embodiment of the invention is shown in FIGS. 8-12 wherein a cotter pin spreader and self-locking device is indicated generally at 30. The device 30 corresponds to the cotter pin spreader and locking device 20 of FIGS. 2-7 in all respects except that it has a different form of locking tab or extension which is indicated generally at 31. The extension 31 is both longer and wider than the tab or extension 25 of the device 20. The outer or distal end of the extension 31 is bent or deformed as indicated at 32. A tab 33 is formed from the sheet material that forms the extension 31.

Figure 8:
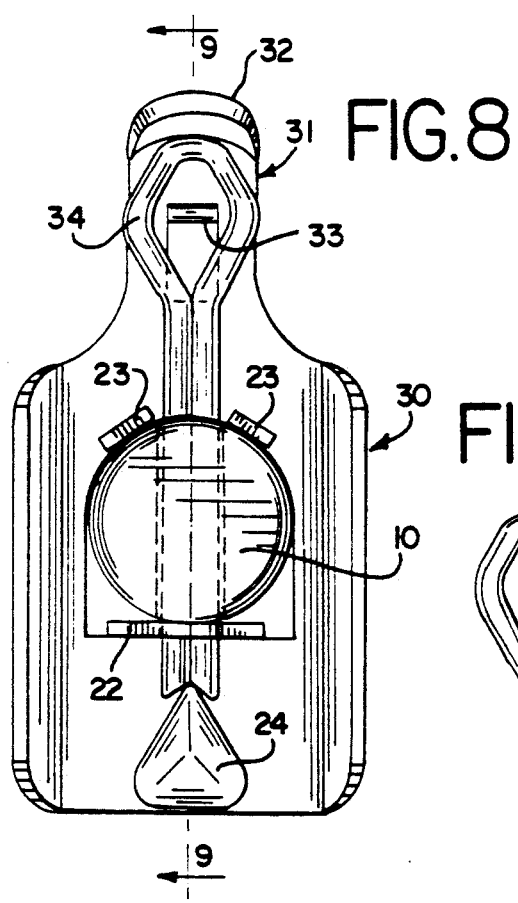
FIG. 8 is a top plan view of a second embodiment of the invention showing a modified cotter pin spreader and locking device of the invention in place over a pin or bolt with an undriven cotter pin inserted in place and ready to be driven.
Figure 9:
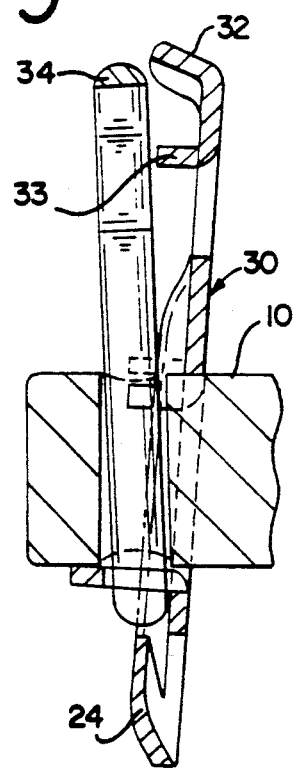
FIG. 9 is a sectional view taken on line 9—9 of FIG. 8 but showing the cotter pin in the process of being inserted.
Figure 11:
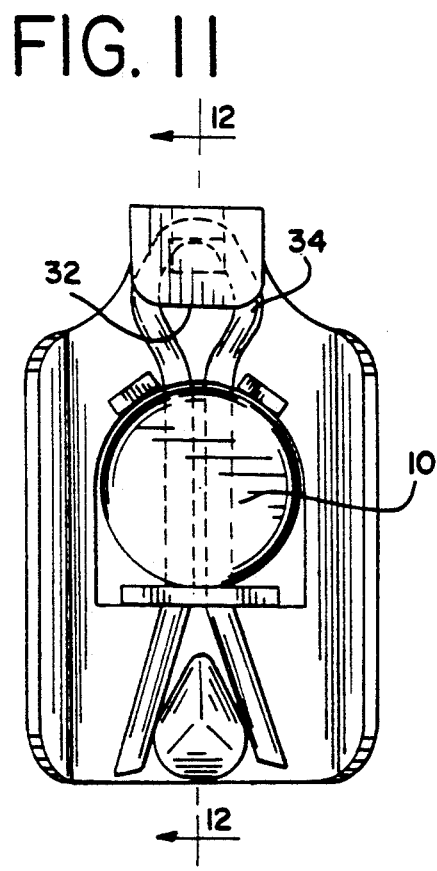
FIG. 11 is a top plan view corresponding to FIG. 8 but showing the condition of the cotter pin and the cotter pin spreading and locking device after the cotter pin has been driven and locked into place.
Figure 12:
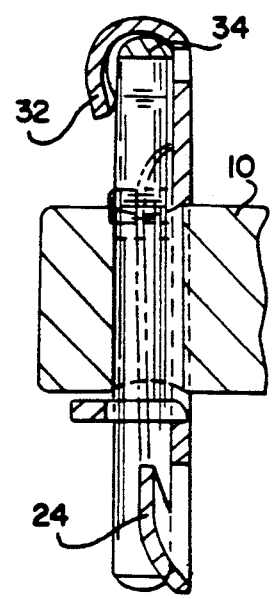
FIG. 12 is a sectional view taken on line 12—12 of FIG. 11.

In use, the combination spreader and locking device 30 is placed over the pin 10 and properly aligned with the cotter pin receiving bore 26 therein. A cotter pin 34 is then inserted as illustrated in FIG. 9, the length of the cotter pin being such that the head of the cotter pin on full insertion, can lie flat against the extension 31 as shown in FIG. 8. The tab 33 prevents rotation of the pin and assists in cooperation with tabs 23—23 the proper insertion of cotter pin 34. Having been thus properly inserted, the installer drives against the outer side of the bent up portion 32 thereby causing the cotter pin 34 to be spread and locked in place as shown in FIGS. 11 and 12.

Figure 10:
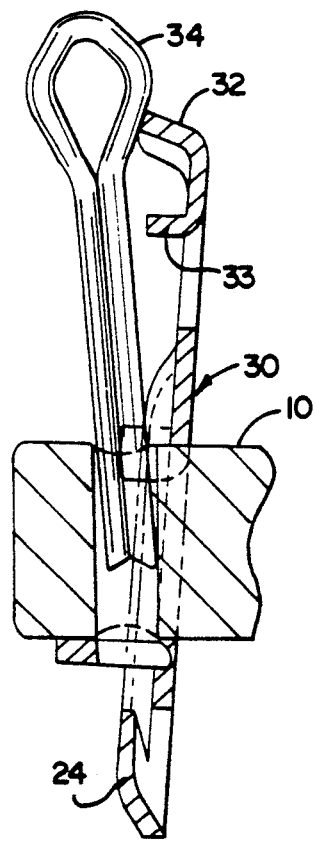
FIG. 10 is a sectional view similar to FIG. 10 but showing the cotter pin rotated 90° into an incorrect position from which it cannot be inserted.

As illustrated in FIG. 10, the cotter pin 34 cannot be inserted and installed in the spreader-locking device 30 unless it is oriented so that the head of the cotter pin is generally parallel to the extension 31.

Still another embodiment of the invention is shown in FIGS. 13-17 wherein the modified cotter pin spreader and locking device is indicated generally at 40. Again, the main body of the device 40 corresponds to the main body of the device shown in FIGS. 2-7 and differs therefrom in respect to the extension formation thereon which is indicated generally at 41. The extension 41 involves more material than either the tab 25 of device 20 or the extension 31 of the device 30 in that, as formed, the extension 41 is substantially wider and is folded over on itself so as to be U-shaped in cross section. The portion of the extension 41 which is generally parallel to and overlies the bed of the device 40 is indicated at 42. A tab 43 is bent out from the bight portion 44 of the extension 41 so as to provide an opening 45 in the bight (FIG. 17) which is wide enough to permit the insertion therethrough of the head of the cotter pin 46.

Figure 13:
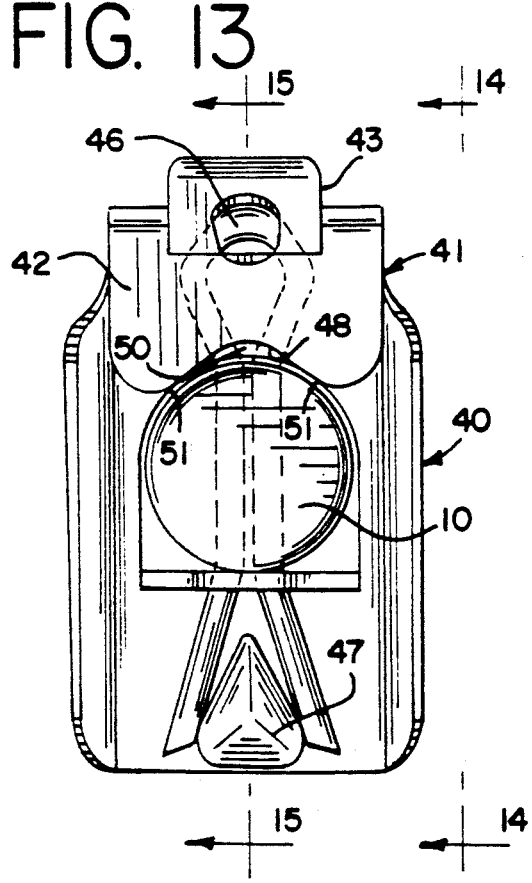
FIG. 13 is a plan view showing a third embodiment of the invention after it has been locked in place on a cotter pin with the cotter pin shown in the spread condition inserted through an aperture in a pin or bolt.
Figure 14:
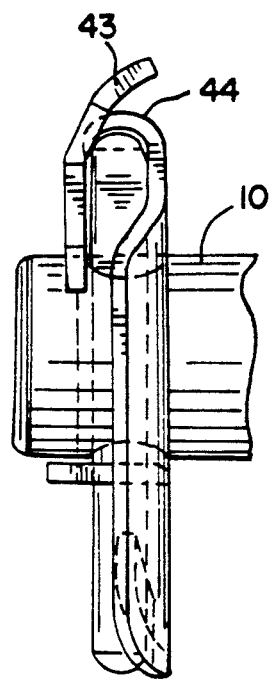
FIG. 14 is an elevational view taken on line 14—14 of FIG. 13.
Figure 15:
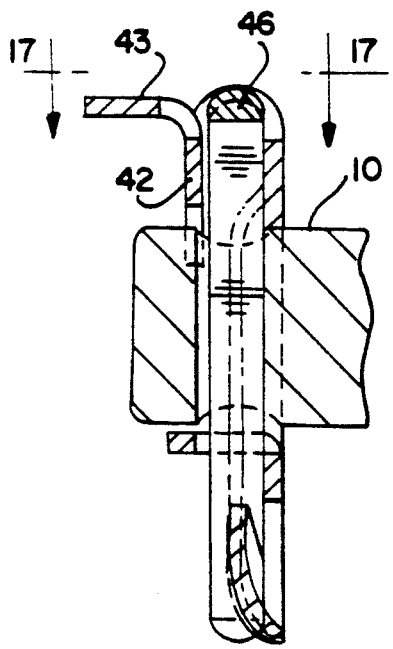
FIG. 15 is a sectional view taken on line 15—15 of FIG. 13 with the locking tab turned up.
Figure 16:
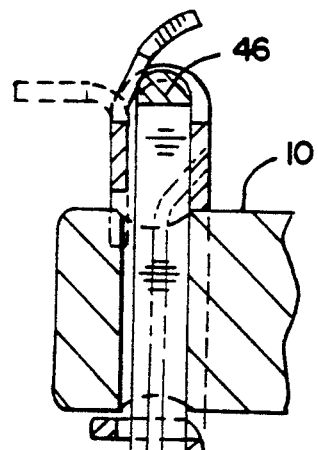
FIG. 16 is a sectional view corresponding to FIG. 15 but showing the condition of the cotter pin spreader and locking device after the cotter pin has been inserted and spread but before a locking tab has been bent over into its locking position as shown in FIGS. 13, 14 and 15.
Figure 17:
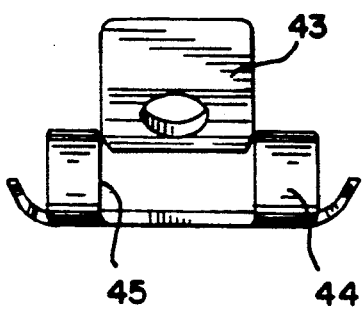
FIG. 17 is an end elevational view taken on line 17—17 of FIG. 16 without the cotter pin being shown.

Initially, the tab 43 is bent up at an angle of approximately 90° as shown in FIG. 15. After the cotter pin 46 has been driven sufficiently to spread the ends on opposite sides of the wedge shaped spreader formation 47, the tab 43 is bent rearwardly and downwardly as shown in FIGS. 13, 14 and 16. It is not necessary to bend or deform the tab 43 beyond the place as shown where it sufficiently engages the head of the cotter pin 46 to prevent its removal or loosening.

To facilitate the proper alignment of the spreader-locking device 40 with the aperture 26 in the pin 10 and the alignment of the cotter pin 46, the distal edge or margin of the overlying portion 42 of the extension 41 is sufficiently cut away or relieved at its mid-portion as indicated at 48 (FIGS. 13, 15 and 16) so as to permit the cotter pin 46 to be viewed through the window opening 50 that is automatically provided between the adjacent side of the pin 10 and the cut away edge 48 as shown in FIG. 13.

It will be seen from FIG. 13 that distal edge of the overlying portion 42 engages or is juxtaposed to the pin 10 in two places as indicated at 51—51.

It will be apparent that the cotter pin spreading and locking devices of this invention can be used in connection with pins or bolts several sizes smaller than the maximum size. Likewise, they may be used with cotter pins appreciably shorter than the maximum length that can be accommodated.

What is claimed is;

1. A device for spreading cotter pin as it is being driven and for locking the spread cotter pin in place comprising, a plate having an opening therein for allowing a bolt or pin to project therethrough generally at right angles thereto, said bolt or pin having a cotter pin receiving aperture extending generally transversely therethrough, said plate having a cotter pin spreader formation thereon disposed to one side of said opening and a deformable cotter pin head locking extension projecting from the edge of said plate adjacent to the side of said opening opposite said first mentioned side and diametrically opposite to said spreader formation and adapted to be deformed into locking relationship with the head of a spread cotter pin.

2. A device for spreading a cotter pin as it is being driven and for locking the spread cotter pin in place comprising, a plate having an opening therein allowing said plate to fit over a bolt or pin which has a cotter pin receiving aperture extending generally transversely therethrough, said plate having a wedge-shaped spreader formation formed thereon disposed to one side of said opening and having a cotter pin shank receiver formation disposed adjacent a side of said opening and in alignment with said spreader formation, and a deformable cotter pin head locking extension projecting from the edge of said plate adjacent to the side of said opening opposite said first mentioned side and diametrically opposite to said spreader formation and adapted to be deformed into locking relationship with the head of a spread cotter pin the shank of which is disposed in said shank receiver formation.

3. A device for spreading a cotter pin as it is being driven and for locking the spread cotter pin in place comprising, a plate having an opening therein allowing said plate to fit over a bolt or pin which has a cotter pin receiving aperture extending generally transversely therethrough, said plate having a wedge-shaped spreader formation formed thereon disposed to one side of said opening and having a first cotter pin shank receiver formation disposed adjacent said one side of said opening in alignment with said spreader formation, a second cotter pin shank receiver formation disposed adjacent the side of said opening opposite said first mentioned thereof and diametrically aligned with said spreader formation and with said first cotter pin shank receiver formation, and a malleable cotter pin head locking extension projecting from the edge of said plate adjacent to said side of said opening diametrically opposite to said spreader formation and adapted to be deformed into locking relationship with the head of a spread cotter pin the shank of which is disposed within said first and second shank receiver formations.

4. A device for spreading a cotter pin as it is being driven and for locking the spread cotter pin in place comprising, a plate having an opening therein allowing said plate to fit over a bolt or pin which has a cotter pin receiving aperture extending generally transversely therethrough, said plate having a wedge-shaped spreader formation formed thereon disposed to one side of said opening and having a cotter pin shank receiver formation disposed adjacent a side of said opening an in alignment with said spreader formation, and a deformable cotter pin head locking extension projecting from the edge of said plate adjacent to the side of said opening opposite said first mentioned side and diametrically opposite to said spreader formation and adapted to be deformed into locking relationship with the head of a spread cotter pin the shank of which is disposed in said shank receiver formation, and wherein the distal end of said deformable cotter pin head locking extension is in the form of a tab inclined with respect to said plate so as to extend away from the same surface of said plate as said spreader formation and said cotter pin receiver formation extend, and of such length as to project into the eye of a cotter pin head placed on said plate in a position to be driven and to deform into locking engagement with said eye when the cotter pin is driven from its head end into its spread condition.

5. The device called for in claim 4 wherein said tab on said locking extension engages the had of a cotter pin and prevents it from being inserted when the head is oriented transversely to said plate.

6. A device for spreading a cotter pin as it is being driven and for locking the spread cotter pin in place comprising, a plate having an opening therein allowing said plate to fit over a bolt or pin which has a cotter pin receiving aperture extending generally transversely therethrough, said plate having a wedge-shaped spreader formation formed thereon disposed to one side of said opening and having a cotter pin shank receiver formation disposed adjacent a side of said opening an in alignment with said spreader formation, and a deformable cotter pin head locking extension projecting from the edge of said plate adjacent to the side of said opening opposite said first mentioned side and diametrically opposite to said spreader formation and adapted to be deformed into locking relationship with the head of a spread cotter pin the shank of which is disposed in said shank receiver formation, and wherein said cotter pin head locking extension has an inclined distal end and inwardly of said distal end a tab whereby the head of a cotter pin may rest on said locking extension with said tab projecting into the eye of the head of a cotter pin while said inclined distal end can be deformed into overlying locking engagement with a portion of the cotter pin head.

7. A device for spreading a cotter pin as it is being driven and for locking the spread cotter pin in place comprising, a plate having an opening therein allowing said plate to fit over a bolt or pin which has a cotter pin receiving aperture extending generally transversely therethrough, said plate having a wedge-shaped spreader formation formed thereon disposed to one side of said opening and having a cotter pin shank receiver formation disposed adjacent a side of said opening an in alignment with said spreader formation, and a deformable cotter pin head locking extension projecting from the edge of said plate adjacent to the side of said opening opposite said first mentioned side and diametrically opposite to said spreader formation and adapted to be deformed into locking relationship with the head of a spread cotter pin the shank of which is disposed in said shank receiver formation, and wherein said cotter pin head locking extension has a portion which overlies an adjacent portion of said plate in spaced parallel relationship therewith, said overlying portion being integrally connected to the remainder of said extension by a bight portion, and said bight portion having an opening therein for insertion of a cotter pin including its head into said device, and said extension having a locking tab that can be deformed into locking engagement with the head of an inserted and driven cotter pin.

8. The device called for in claim 7 wherein said locking tab is formed from the material removed from said bight portion to form said opening therein.

9. The device called for in claim 7 wherein the transverse distal edge of said overlying portion is relieved sufficiently to provide an opening through which the shank of an inserted cotter pin may be viewed.

10. The device called for in claim 7 wherein the transverse distal edge of said overlying portion engages or is juxtaposed to a bolt or pin inserted into said opening in said plate.

11. A device for locking a cotter pin after being driven in place from its head end comprising, a plate having an opening therein for allowing a bolt or pin to project therethrough generally at right angles thereto, said bolt or pin having ac otter pin receiving aperture extending generally transversely therethrough, and said plate having a deformable cotter pin head locking extension projecting form said plate adapted to be deformed into locking relationship with the head of a cotter pin, and wherein the distal end of said deformable cotter pin head locking extension is in the form of a tab inclined with respect to said plate and of such length as to project into the eye of a cotter pin head placed on said plate in a position to be driven and to deform into locking engagement with said eye when the cotter pin is driven from its head end.

12. The device called for in claim 11 wherein said tab on said locking extension engages the head of a cotter pin and prevents it from being inserted when the head is oriented transversely to said plate.

13. A device for locking a cotter pin after being driven in place from its head end comprising, a plate having an opening therein for allowing a bolt or pin to project therethrough generally at right angles thereto, said bolt or pin having a cotter pin receiving aperture extending generally transversely therethrough, and said plate having a deformable cotter pin head locking extension projecting rom said plate adapted to be deformed into locking relationship with the head of a cotter pin, and wherein said cotter pin head locking extension has an inclined distal end and inwardly of said distal end a tab whereby the head of a cotter pin may rest on said locking extension with said tab projecting into the eye of the head of a cotter pin while said inclined distal end can be deformed into overlying locking engagement with a portion of the cotter pin head.

14. A device for locking a cotter pin after being driven in place from its head end comprising, a plate having an opening therein for allowing a bolt or pin to project therethrough generally at right angles thereto, said bolt or pin having a cotter pin receiving aperture extending generally transversely therethrough, and said plate having a deformable cotter pin head locking extension projecting rom said plate adapted to be deformed into locking relationship with the head of a cotter pin, and wherein said cotter pin head locking extension has a portion which overlies an adjacent portion of said plate in spaced parallel relationship therewith, said overlying portion being integrally connected to the remainder of said extension by a bight portion, and said bight portion having an opening therein for insertion of a cotter pin including its head into said device, and said extension having a locking tab that can be deformed into locking engagement with the head of an inserted and driven cotter pin.

15. The device called for in claim 14 wherein said locking tab is formed from the material removed from said bight portion to form said opening therein.

16. The device called for in claim 14 wherein the transverse distal edge of said overlying portion is relieved sufficiently to provide an opening through which the shank of an inserted cotter pin may be viewed.

17. The device called for in claim 14 wherein the transverse distal edge of said overlying portion engages or is juxtaposed to a bolt or pin inserted into said opening in said plate.

* * * * *